(12) United States Patent
Chen et al.

(10) Patent No.: US 9,357,197 B2
(45) Date of Patent: May 31, 2016

(54) MULTI-LAYER BACKWARDS-COMPATIBLE VIDEO DELIVERY FOR ENHANCED DYNAMIC RANGE AND ENHANCED RESOLUTION FORMATS

(71) Applicant: Dolby Laboratories Licensing Corporation, San Francisco, CA (US)

(72) Inventors: Tao Chen, Palo Alto, CA (US); Samir N. Hulyalkar, Los Gatos, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 494 days.

(21) Appl. No.: 13/891,997

(22) Filed: May 10, 2013

(65) Prior Publication Data

US 2013/0314495 A1 Nov. 28, 2013

Related U.S. Application Data

(60) Provisional application No. 61/651,456, filed on May 24, 2012.

(51) Int. Cl.
*H04N 13/00* (2006.01)
*H04N 15/00* (2006.01)
(Continued)

(52) U.S. Cl.
CPC ............ *H04N 13/0048* (2013.01); *H04N 19/33* (2014.11); *H04N 19/597* (2014.11)

(58) Field of Classification Search
CPC .......... H04N 13/0062; H04N 13/0048; H04N 13/0066; H04N 19/30; H04N 19/187; H04N 19/597; H04N 5/2355; H04N 11/002
USPC ......................................................... 348/43
See application file for complete search history.

(56) References Cited

U.S. PATENT DOCUMENTS

2009/0175338 A1* 7/2009 Segall ...................... 375/240.14
2009/0190662 A1* 7/2009 Park et al. ................ 375/240.16
2010/0183071 A1* 7/2010 Segall et al. ............. 375/240.16
(Continued)

FOREIGN PATENT DOCUMENTS

| WO | 2012/004741 | 1/2012 |
| WO | 2012/142471 | 10/2012 |
| WO | 2013/049383 | 4/2013 |

OTHER PUBLICATIONS

Dolby's Frame Compatible Full Resolution (FCFR) 3D System Specifications. Dolby Laboratories Inc. Dec. 2010.
(Continued)

*Primary Examiner* — Michael Lee

(57) ABSTRACT

A sequence of enhanced dynamic range (EDR) images and a sequence of standard dynamic range images are encoded using a backwards-compatible SDR high-definition (HD) base layer and one or more enhancement layers. The EDR and SDR video signals may be of the same resolution (e.g., HD) or at different resolutions (e.g., 4K and HD) and are encoded using a dual-view-dual-layer (DVDL) encoder to generate a coded base layer (BL) and a coded enhancement layer (EL). The DVDL encoder includes a reference processing unit (RPU) which is adapted to compute a reference stream based on the coded BL stream. The RPU operations include post-processing, normalization, inverse normalization, and image registration. Decoders for decoding the coded BL and EL streams to generate a backwards compatible 2D SDR stream and additional 2D or 3D SDR or EDR streams, are also described.

10 Claims, 9 Drawing Sheets

(51) Int. Cl.
*H04N 19/597* (2014.01)
*H04N 19/33* (2014.01)

(56) References Cited

U.S. PATENT DOCUMENTS

| | | | | |
|---|---|---|---|---|
| 2011/0090959 A1* | 4/2011 | Wiegand | ............ | H04N 19/593 375/240.12 |
| 2011/0154426 A1* | 6/2011 | Doser et al. | ............ | 725/118 |
| 2011/0194618 A1* | 8/2011 | Gish et al. | ............ | 375/240.25 |
| 2012/0026288 A1 | 2/2012 | Tourapis | | |
| 2012/0027079 A1 | 2/2012 | Ye | | |
| 2012/0050474 A1* | 3/2012 | Segall | ............ | 348/43 |
| 2012/0092452 A1 | 4/2012 | Tourapis | | |
| 2013/0120656 A1* | 5/2013 | Wilson et al. | ............ | 348/563 |
| 2013/0148029 A1* | 6/2013 | Gish et al. | ............ | 348/708 |
| 2013/0235072 A1* | 9/2013 | Longhurst et al. | ............ | 345/605 |
| 2014/0022460 A1* | 1/2014 | Li et al. | ............ | 348/708 |

OTHER PUBLICATIONS

Luthra, A. et al "Use Cases for the Scalable Enhancement of HEVC" ISO/IEC JTC1/SC29/WG11, Coding of Moving Pictures and Audio, Apr. 2012, Geneva, Switzerland.

\* cited by examiner

MULTI-LAYER BACKWARDS-COMPATIBLE VIDEO DELIVERY FOR ENHANCED DYNAMIC RANGE AND ENHANCED RESOLUTION FORMATS

CROSS REFERENCE TO RELATED APPLICATIONS

This application claims the benefit of U.S. Provisional Application No. 61/651,456 filed on May 24, 2012, which is hereby incorporated by reference in its entirety.

TECHNOLOGY

The present invention relates generally to images. More particularly, an embodiment of the present invention relates to layered encoding, transmission, and decoding of enhanced dynamic range (EDR) and enhanced resolution video formats.

BACKGROUND

Video broadcasting standards for digital television, such as the ATSC (Advanced Television Systems Committee) specification in the United States and the family of DVB (Digital Video Broadcasting) international standards, allow broadcasters to transmit digital content in a variety of resolutions and formats, such as 480p (e.g., 720×480 at 60 frames per second), 1080i (e.g., 1920×1080 at 60 fields per second), or 720p (1280×720 at 60 frames per second). Typically, a broadcasting station will allocate one or more channels for a particular broadcast, where each channel utilizes a single transmission format. For example, a sports station may broadcast a football game in 720p in one channel and in 480p in another channel. Broadcasting stations may prefer to use progressive transmission mode (e.g., 720p) for sports or movies, and interlaced transmission (e.g., 1080i) for regular programming (e.g., news and daytime TV series).

Recently, a number of emerging technologies compete to bring new levels of visual experience to consumers. These technologies include: 3D video, Enhanced Dynamic Range (EDR) video, and enhanced resolution video (e.g., 4K video).

3D video systems garner great interest for enhancing a consumer's experience, whether at the cinema or in the home. These systems use stereoscopic or autostereoscopic methods of presentation, including:

(i) anaglyph—provides left/right eye separation by filtering the light through a two color filter, commonly red for one eye, and cyan for the other eye;

(ii) linear polarization—provides separation at the projector by filtering the left eye through a linear polarizer (commonly) oriented vertically, and filtering the right eye image through a linear polarizer oriented horizontally;

(iii) circular polarization—provides separation at the projector by filtering the left eye image through a (commonly) left handed circular polarizer, and filtering the right eye image through a right handed circular polarizer;

(iv) shutter glasses—provides separation by multiplexing the left and right images in time, and (v) spectral separation—provides separation at the projector by filtering the left and right eye spectrally where the left and right eye each receives a complementary portion of the red, green, and blue spectrums.

As used herein, the term dynamic range (DR) is a range of intensity (e.g., luminance, luma) in an image, e.g., from darkest darks to brightest brights. Video broadcasting today is typically characterized by approximately three orders of magnitude of dynamic range (e.g., standard dynamic range, SDR), corresponding to the limited rendering capabilities of conventional televisions and computer monitors. This is a humble presentation for some 14 to 15 orders of magnitude of dynamic range (e.g., high dynamic range, HDR) perceptible to a human visual system (with adaptation), or even the 5 to 6 orders of magnitude simultaneously perceptible (e.g., Enhanced dynamic range, EDR, or Visual dynamic range, VDR)). EDR video content combined with EDR displays will be able to bring new levels of visual experience, independent of screen size.

4K video is the latest in a line of broadcast and media resolutions and is due to replace HD (high definition, 1920×1080 pixels) as the next enhanced resolution signal available for movies and TV. HD itself has been with us for about a decade and is used in Blu-ray movies and HD broadcasts. In general, 4K refers to a resolution of roughly 4000 pixels wide and about 2000 pixels high. Currently 4K is a catch-all term for a number of enhanced resolution standards that are reasonably close to that resolution. For example, the first generation of consumer TVs year labeled 4K will most likely be Quad HD (e.g., 3840×2160).

In order for consumers to discern visual difference of 4K from HD, big screen TVs are required. Currently, the most popular HDTV sizes are between 32 and 46 inches. Such sizes will have difficulty demonstrating the superiority of 4K pictures over traditional HD (e.g., 720p or 1080p) pictures. Televisions supporting Enhanced dynamic range (EDR) will be able to bring a new visual experience which is independent of screen size. The combination of 3D, 4K, and EDR is expected to deliver a new experience to the theaters and the home Increasing the frame rate, resolution, and dynamic range provides an improved visual experience at the expense of higher bandwidth and storage requirements. For example, a 3D stereoscopic video, with twice the images (e.g., left and right eye perspective images), may already require double the bandwidth and storage over a two-dimensional (2D) video. Similarly EDR video requires pixel resolutions at higher bit depth than the traditional 8-bit bit depth per color component. As appreciated by the inventors here, improved techniques for 3D, EDR, and 4K image processing, given practical bandwidth and storage requirements, are desirable for a superior immersive experience. It is further appreciated that these improved techniques preferably are backwards compatible with legacy HD and SDR systems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1:
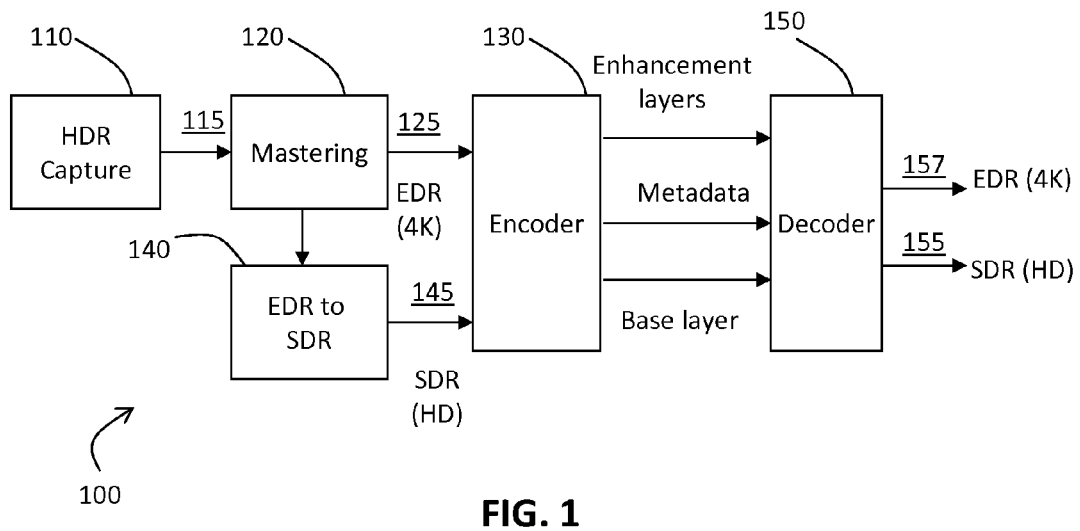
FIG. 1 depicts an example data flow for a system for the joint delivery of EDR and SDR signals according to an embodiment of the present invention.

Layered encoding and decoding of 2D or 3D SDR HD, EDR HD, or EDR 4K, image sequences is described herein. Given a pair of corresponding images, that is, images that represent the same scene but at different views and at different levels of dynamic range or resolution, this specification describes methods that allow an encoder to efficiently combine and deliver these views so that legacy TVs can display at least a backwards compatible SDR HD signal while enhanced resolution or EDR TVs can also display higher resolution and higher dynamic range versions of the signal. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily obscuring the present invention.

Overview

Example embodiments described herein relate to layered encoding and decoding of signals with enhanced dynamic range and enhanced resolution video formats. A sequence of enhanced dynamic range (EDR) images and a sequence of standard dynamic range images are encoded using a backwards-compatible SDR high-definition (HD) base layer and one or more enhancement layers. The EDR and SDR video signals may be of the same resolution (e.g., HD) or at different resolutions (e.g., 4K and HD) and are encoded using a dual-view-dual-layer (DVDL) encoder to generate a coded base layer (BL) and a coded enhancement layer (EL). The DVDL encoder includes a reference processing unit (RPU) which is adapted to compute a reference stream based on the coded BL stream. The RPU operations include post-processing, normalization, inverse normalization, and image registration. Corresponding decoders for decoding the coded BL and EL streams to generate a backwards compatible 2D SDR stream and additional 2D or 3D SDR or EDR streams, are also described.

One embodiment depicts example dual-view-dual-layer encoding and decoding modules for the joint delivery of EDR 4K video and SDR HD video.

Another embodiment depicts example dual-view-dual-layer encoding and decoding modules for the joint delivery of EDR 4K video and SDR HD video using an additional residual signal.

Another embodiment depicts an example data flow for encoding, decoding, and joint delivery of 3D SDR HD and 3D EDR HD signals.

Another embodiment depicts an example data flow for encoding, decoding, and joint delivery of 3D EDR HD and 2D SDR HD signals.

Another embodiment depicts an example data flow for encoding, decoding, and joint delivery of 3D EDR 4K and 2D SDR HD signals.

Another embodiment depicts an example data flow for encoding, decoding, and joint delivery 3D SDR HD, 2D SDR HD, and 2D EDR 4K signals.

NOTATION & NOMENCLATURE

As used herein, the term high dynamic range (HDR) relates to a DR breadth that spans the some 14 to 15 orders of magnitude of the human visual system. For example, well adapted humans with essentially normal vision (e.g., in one or more of a statistical, physiological, biometric or ophthalmological sense) have an intensity range that spans about 15 orders of magnitude. Adapted humans may perceive dim light sources of as few as a mere handful of photons. Yet, these same humans may perceive the near painfully brilliant intensity of the noonday sun in desert, sea or snow (or even glance into the sun, however briefly to prevent damage). This span though is available to 'adapted' humans, e.g., those whose visual system has a time period in which to reset and adjust.

In contrast, the DR over which a human may simultaneously perceive an extensive breadth in intensity range may be somewhat truncated, in relation to HDR. As used herein, the terms enhanced dynamic range (EDR), visual dynamic range, or variable dynamic range (VDR) may individually or interchangeably relate to the DR that is simultaneously perceivable by a HVS. As used herein, EDR may relate to a DR that spans 5 to 6 orders of magnitude. Thus while perhaps somewhat narrower in relation to true scene referred HDR, EDR nonetheless represents a wide DR breadth.

As with the scalable video coding and high definition television (HDTV) technologies, extending image DR typically involves a bifurcate approach. For example, scene referred HDR content that is captured with a modern HDR capable camera may be used to generate an SDR version of the content, which may be displayed on conventional SDR displays. In one approach, generating the SDR version from the captured EDR version may involve applying a global tone mapping operator (TMO) to intensity (e.g., luminance, luma) related pixel values in the HDR content. In a second approach, generating an SDR image may involve applying an invertible operator (or predictor) on the EDR data. To conserve bandwidth or for other considerations, transmission of both of the actual captured EDR content and a corresponding SDR version may not be a practical approach.

Thus, an inverse tone mapping operator (iTMO), inverted in relation to the original TMO, or an inverse operator in relation to the original predictor, may be applied to the SDR content version that was generated, which allows a version of the EDR content to be predicted. The predicted EDR content version may be compared to originally captured HDR content. For example, subtracting the predicted EDR version from the original EDR version may generate a residual image. An encoder may send the generated SDR content as a base layer (BL), and package the generated SDR content version, any residual image, and the iTMO or other predictors as an enhancement layer (EL) or as metadata.

Sending the EL and metadata, with its SDR content, residual and predictors, in a bitstream typically consumes less bandwidth than would be consumed in sending both the HDR and SDR contents directly into the bitstream. Compatible decoders that receive the bitstream sent by the encoder may decode and render the SDR on conventional displays. Compatible decoders however may also use the residual image, the iTMO predictors, or the metadata to compute a predicted version of the HDR content therefrom, for use on more capable displays.

Stereoscopic or 3D imaging adds an additional level of complexity to EDR images. Under stereoscopic imaging, each image or video frame is represented by at least two views. For backward compatibility, legacy decoders can decode at least one of the views; however, stereoscopic decoders can reconstruct and display both views. The example video encoding and decoding solutions that are described herein facilitate migration from SDR HDTVs to EDR 4K TVs. Example embodiments relate to layered encoding and decoding of 2D or 3D SDR HD or EDR 4K images and are described herein, with reference to FIGS. 1-10, inclusive.

Example EDR 4K-SDR HD System

FIG. 1 depicts an example data flow in a layered EDR 4K-SDR HD system 100, according to an embodiment of the present invention. An HDR image or video sequence is captured or generated using HDR camera 110 or other similar means. Following capture, the captured image or video is processed by a mastering process to create a target 3D or 2D EDR 4K image 125. The mastering process may incorporate a variety of processing steps, such as: editing, primary and secondary color correction, color transformation, and noise filtering. The EDR 125 output of this process typically represents the director's intent on how the captured image will be displayed on a target EDR display (including, a cinema EDR projection system).

The mastering process may also output a corresponding 3D or 2D SDR HD image 145, representing the director's intent on how the captured image will be displayed on a legacy SDR display. The SDR output 145 may be provided directly from mastering circuit 120 or it may be generated with a separate EDR-to-SDR converter 140.

In this example embodiment, the EDR 125 and SDR 145 signals are inputted into an encoder 130. Purpose of encoder 130 is to create a coded bitstream that reduces the bandwidth required to transmit the EDR 4K and SDR HD signals, but also allows a corresponding decoder 150 to decode and render either the SDR HD or EDR 4K signals. In an example embodiment, encoder 130 may be a layered encoder representing its output as a base layer, one or more enhancement layers, and metadata. As used herein, the term "metadata" relates to any auxiliary information that is transmitted as part of the coded bitstream and assists a decoder to render a decoded image. Such metadata may include, but are not limited to, such data as: color space or gamut information, dynamic range information, tone mapping information, or predictor operators, such as those described herein.

On the receiver, a decoder 150 uses the received coded bitstreams and metadata to render either an SDR HD image 155 (2D or 3D), or an EDR 4K image 157 (2D or 3D) according to the capabilities of the target display. For example, a monoscopic SDR display may use only the base layer and the metadata to render a single-view SDR image. In contrast, an EDR 4K display may use information from all input layers and the metadata to render an EDR 4K signal. An embodiment of the present invention may be implemented with a display that uses two views. Additionally or alternatively, an embodiment of the present invention may also be implemented with a display that uses more than two views (e.g., 3, 4, 5, or more views). For example, an embodiment may be implemented with an auto-stereoscopic display.

Example Dual-View-Dual-Layer (DVDL) Encoder and Decoder

Figure 2A:
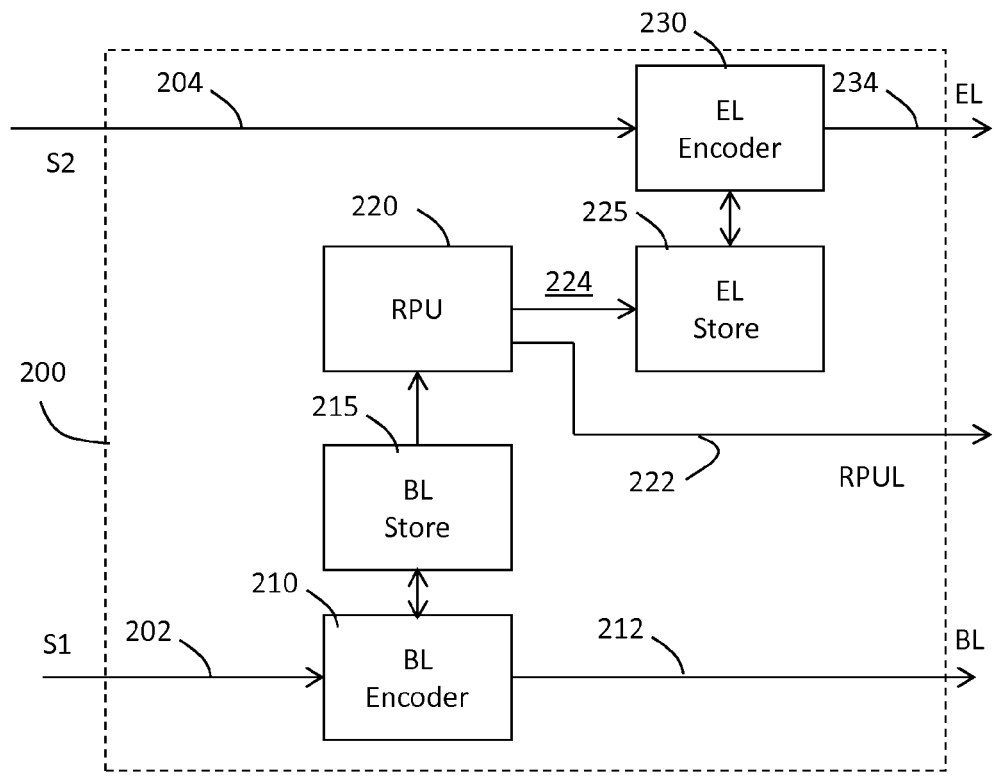
FIG. 2A and FIG. 2B depict example dual-view-dual-layer encoding and decoding modules, according to an embodiment of the present invention.

Given two related video signals (e.g., S1 202 and S2 204), FIG. 2A depicts a block diagram of an embodiment of a dual-view-dual-layer (DVDL) encoder module for their efficient encoding using a base layer (BL) 212 and an enhancement layer (EL) 234. For example, in one embodiment, S1 202 may correspond to an SDR HD signal and S2 204 may correspond to the EDR 4K signal. In another embodiment, S1 202 may correspond to the first view of a 3D EDR or SDR signal and S2 204 may correspond to the second view of the same signal.

As depicted in FIG. 2A, signal S1 202 is coded into a Base Layer (BL) 212 using BL encoder 210. BL encoder may be any of well-known video encoders, such as those defined by the MPEG-1, MPEG-2, H.264, or similar specifications. The output of the BL encoder may be also decoded (not shown), and output frames may be stored in the BL reference storage area 215. These frames may be post-processed by a reference processor unit (RPU) 220.

As used herein in relation to the RPU, the term "Reference" is not meant to imply or express, and should not be interpreted as meaning, that this picture is explicitly used as a reference within the complete coding process (e.g., in the sense of a "reference picture"). The RPU may conform to a description set forth in the following two patent application publications, filed pursuant to the Patent Cooperation Treaty (PCT), which are incorporated herein by reference for all purposes as if fully set forth herein: (1) WO 2010/123909 A1 by Tourapis, A., et al. for Directed Interpolation/Post-processing Methods for Video Encoded Data; and (2) WO 2011/005624 A1 by Tourapis, A., et al. for Encoding and Decoding Architecture for Frame Compatible 3D Video Delivery. The following descriptions of the RPU apply, unless otherwise specified to the contrary, both to the RPU of an encoder and to the RPU of a decoder. Artisans of ordinary skill in fields that relate to video coding will understand the differences, and will be capable of distinguishing between encoder-specific, decoder-specific and generic RPU descriptions, functions and processes upon reading of the present disclosure. Within the context of a 3D video coding system as depicted in FIG. 2A, the RPU (220) accesses and interpolates decoded image S1 (202), according to a set of rules of selecting different RPU filters and processes.

The RPU 220 enables the interpolation process to be adaptive at a region level, where each region of the picture/sequence is interpolated according to the characteristics of that region. RPU 220 can use horizontal, vertical, or two dimensional (2D) filters, edge adaptive or frequency based region-dependent filters, and/or pixel replication filters or other methods or means for interpolation and image processing.

For example, one pixel replication filter may simply perform a zero-order-hold, e.g., each sample in the interpolated image will be equal to the value of a neighboring sample in a low resolution image. Another pixel replication filter may perform a cross-view copy operation, e.g., each interpolated sample in one view, will be equal to the non-interpolated co-located sample from the opposing view.

Additionally or alternatively, a disparity-compensated copy scheme can also be used in the RPU. For example, the filter may copy a non-colocated region of samples where the location of the region to be copied, which may also be a region from a different view, can be specified using a disparity vector. The disparity vector may be specified using integer or sub-pixel accuracy and may involve simple, e.g. translational motion parameter, or more complex motion models such as affine or perspective motion information and/or others.

An encoder may select RPU filters and outputs regional processing signals, which are provided as input data to a decoder RPU (e.g., 270). The signaling (e.g., RPUL 222) specifies the filtering method on a per-region basis. For example, parameters that relate to region attributes such as the number, size, shape and other characteristics are may be specified in an RPUL related data header. Some of the filters may comprise fixed filter coefficients, in which case the filter coefficients need not be explicitly signaled by the RPU. Other filter modes may comprise explicit modes, in which the filter parameters, such as coefficient values and number of horizontal/vertical taps are signaled explicitly.

The filters may also be specified per each color component. The RPU may specify linear filters. Non-linear filters such as edge-adaptive filters, bi-lateral filters, etc., may also be specified in the RPU. Moreover, prediction models that specify advanced motion compensation methods such as the affine or perspective motion models may also be signaled.

The RPU data signaling 222 can either be embedded in the encoded bitstream, or transmitted separately to the decoder. The RPU data may be signaled along with the layer on which the RPU processing is performed. Additionally or alternatively, the RPU data of all layers may be signaled within one RPU data packet, which is embedded in the bitstream either prior to or subsequent to embedding the layer 2 encoded data. The provision of RPU data may be optional for a given layer. In the event that RPU data is not available, a default scheme may thus be used for upconversion of that layer. Not dissimilarly, the provision of an enhancement layer encoded bitstream is also optional.

An embodiment allows for multiple possible methods of optimally selecting the filters and filtered regions in each RPU. A number of criteria may be used separately or in conjunction in determining the optimal RPU selection. The optimal RPU selection criteria may include the decoded quality of the base layer bitstream, the decoded quality of the enhancement layer bitstreams, the bit rate required for the encoding of each layer including the RPU data, and/or the complexity of decoding and RPU processing of the data.

An RPU may be optimized independently of subsequent processing in the enhancement layer. Thus, the optimal filter selection for an RPU may be determined such that the prediction error between the interpolated base layer images and the original left and right eye images is minimized, subject to other constraints such as bitrate and filter complexity.

The RPU 220 may serve as a pre-processing stage that processes information from BL encoder 210, before utilizing this information as a potential predictor for the enhancement layer in EL encoder 230. Information related to the RPU processing may be communicated (e.g., as metadata) to a decoder (e.g., 150) using an RPU Layer (RPUL) stream 222.

RPU processing may comprise a variety of image processing operations, such as: color space transformations, non-linear quantization, luma and chroma up-sampling, filtering, or SDR to EDR mapping. In a typical implementation, the EL 234, BL 212, and RPUL 222 signals are multiplexed into a single coded bitstream (not shown).

Signal S2 204 is coded into an Enhancement Layer (EL) 234 using EL encoder 230. EL encoder may be any of well-known video encoders, such as those defined by the MPEG-1, MPEG-2, H.264, or similar specifications. In another example embodiment, EL and BL encoders may also comply with the specifications of the High Efficiency Video Coder (HEVC) specification now under development by the ISO/IEC Moving Pictures Expert Group.

Figure 2B:
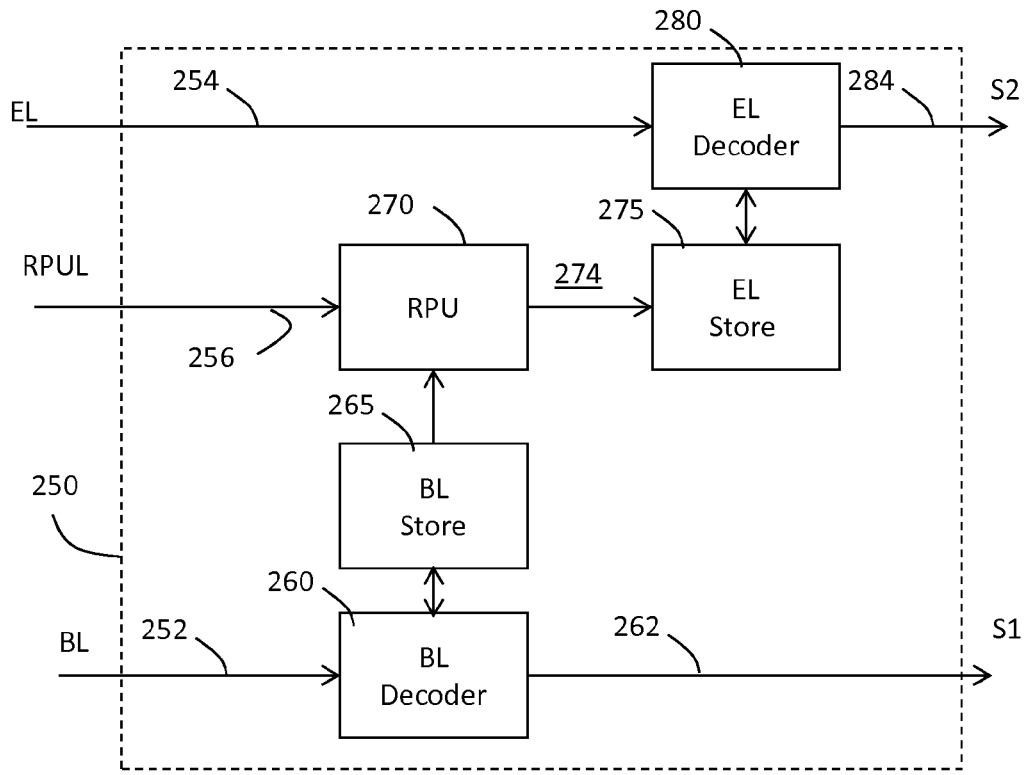

FIG. 2B shows an example implementation of a DVDL decoder module 250 according to an embodiment of this invention. Decoding module 250 receives a coded bitstream that may combine a base layer 252, an enhancement layer 254 and an RPU layer 256. The coded BL layer 252 may be decoded on its own using BL decoder 260 to generate a first signal S1 262. BL decoder 260 may be any decoder corresponding to the BL encoder 210 (e.g., an MPEG-2, MPEG-4, MPEG-4, or the like decoder). Frames from the BL decoder may also be stored in the reference BL store unit 265 so they can be used as reference frames in decoding the enhancement layer stream 254. Taking into consideration metadata stored in the RPUL stream 256, RPU 270 post-process data in the BL store unit 265 and outputs reference frames into the EL store unit 275. EL decoder 280, using reference frames from either the EL stream 275 or BL 252 generates output signal S2 284, which corresponds to a second signal, related to the first output signal S1 262.

Example Joint SDR HD and EDR 4K Signaling

Figure 3A:
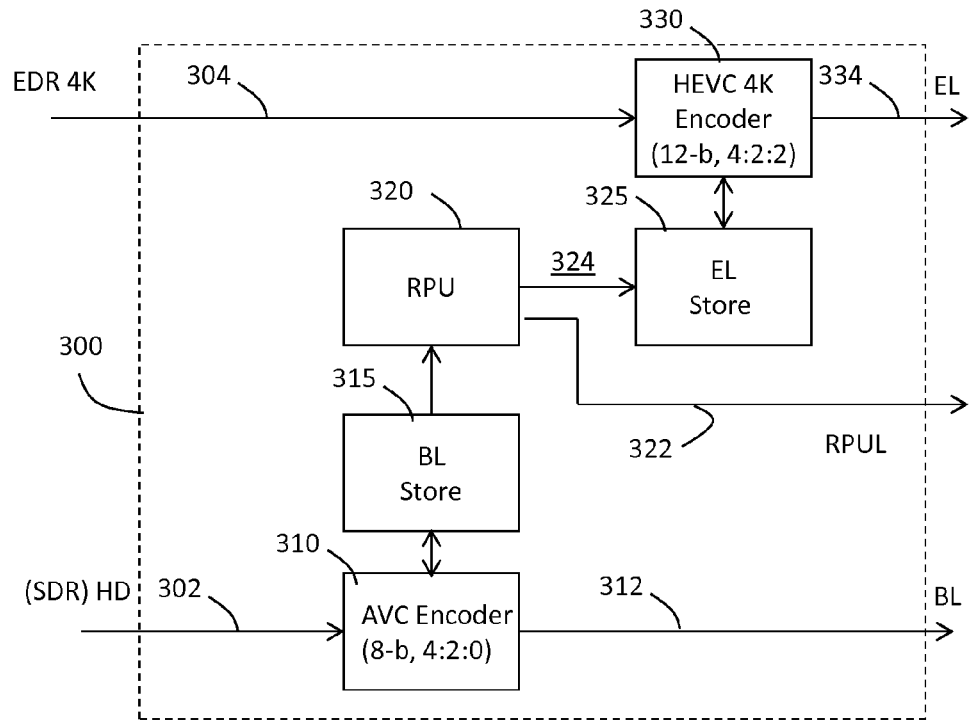
FIG. 3A and FIG. 3B depict an example encoder and an example decoder for the joint delivery of EDR 4K and SDR HD signals, according to an embodiment of the present invention.

FIG. 3A depicts an example framework for the joint encoding and transmission of a stream that combines a backwards compatible SDR HD stream and an enhanced EDR 4K stream according to an embodiment. Inputs to the encoding system 300 comprise an SDR HD stream 302 and an EDR 4K stream 304. The HD stream 302 may be encoded in encoder 310 using a legacy encoder (e.g., AVC (H.264)) using 8-bit data in a 4:2:0 color format. The HD stream 302 is encoded on its own as the base layer 312. The EDR 4K stream 304 may be recorded by a more efficient encoder (e.g., HEVC) using higher bit-depth (e.g., 12 bit per pixel per color component) and higher chroma resolution (e.g., 4:2:2). Using the RPU processor 320 and associated storage (315 and 325), the EDR 4K stream may be compressed more efficiently by referencing decoded frames from the BL (SDR HD) stream.

Figure 3B:
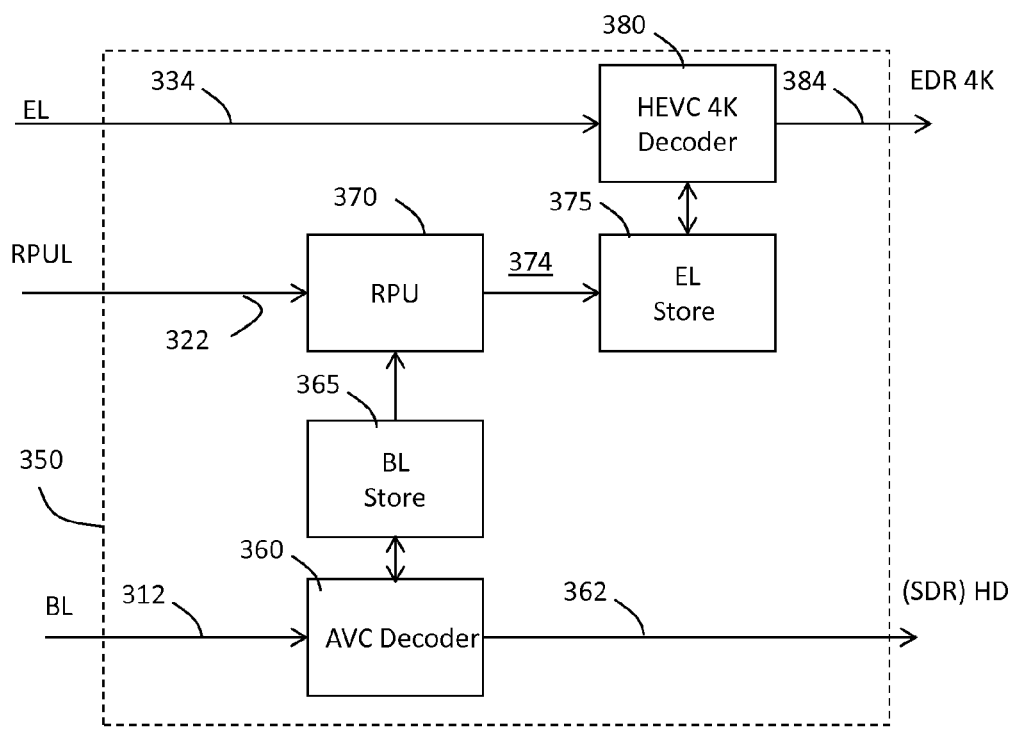

FIG. 3B depicts an example decoder framework for decoding the combined BL 312 and EL 334 streams. The received coded BL stream 312 may be decoded by a standard AVC decoder 360 to output a backwards compatible SDR HD stream 362 corresponding to the transmitted SDR HD signal 302. More advanced decoders, may integrate RPU 370 and a second decoder 380 (e.g., an HEVC decoder) to generate an output EDR 4K 384 stream based on information extracted from the coded BL 312, the coded EL 334, and the received RPUL stream 322.

Example SDR HD to EDR 4K Conversion and Image Registration

Figure 4:
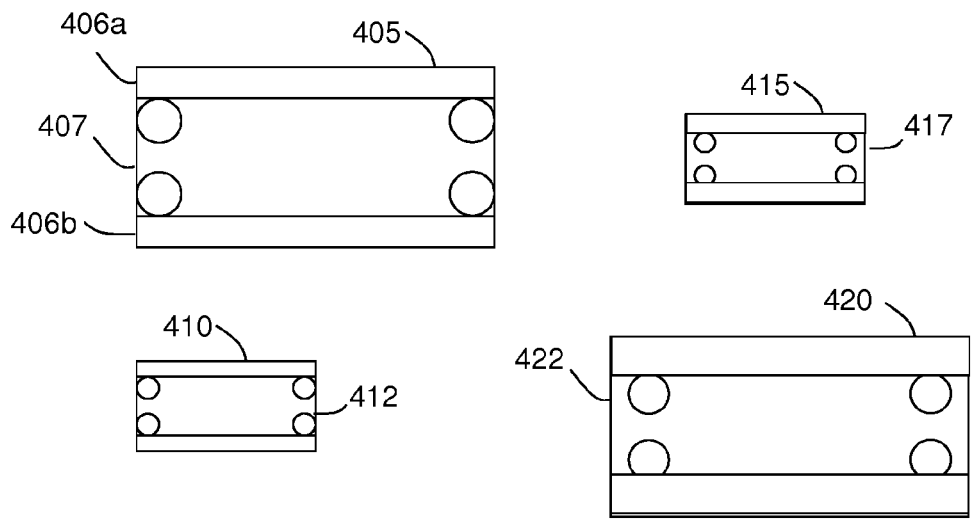
FIG. 4 depicts example representations of HD and 4K frames.

In production, the HD picture 302 and the 4K picture 304 represent the same scene at different resolutions; however, the HD picture 302 may not be the result of a simple downscaling of the 4K picture, but rather a combination of downscaling and cropping operations. An example of such a process is depicted in FIG. 4. In FIG. 4, let picture 405 depict a color-graded 4K picture. Picture frame 405 may comprise an active picture area 407 positioned in between two (optional) horizontal black bars 406a and 406b. A direct 2-to-1 down-sampling (or down-scaling) of 405 would yield the HD picture 410, where all elements of 405 have been downscaled by the same ratio (2:1). However, in practice, the active picture area 407 of 405 may be scaled and cropped differently than the black bars. For example, let HD picture 415 denote the final color graded HD picture 302. Picture 415 may have wider horizontal black bars than HD picture 410, and the active picture area 417 may represent a downscaled and cropped version of 407, where the downscaling is slightly larger (or lower) than 2-to-1.

Given the HD picture 415, if RPU 320 attempts to match the input 4K picture 304 (e.g., 405) by simple 1-to-2 up-scaling of all the pixels, then there could be significant mismatch between the estimated 4K picture 420 and the original 4K picture 405. Such a mismatch may affect significantly the coding efficiency of the EL Encoder 330. For example, mismatch may cause the motion estimation process between an input EDR 4K frame and an approximated RPU 4K frame to either fail or yield non-zero motion vectors, thus decreasing the overall coding efficiency of the EL stream.

Figure 5:
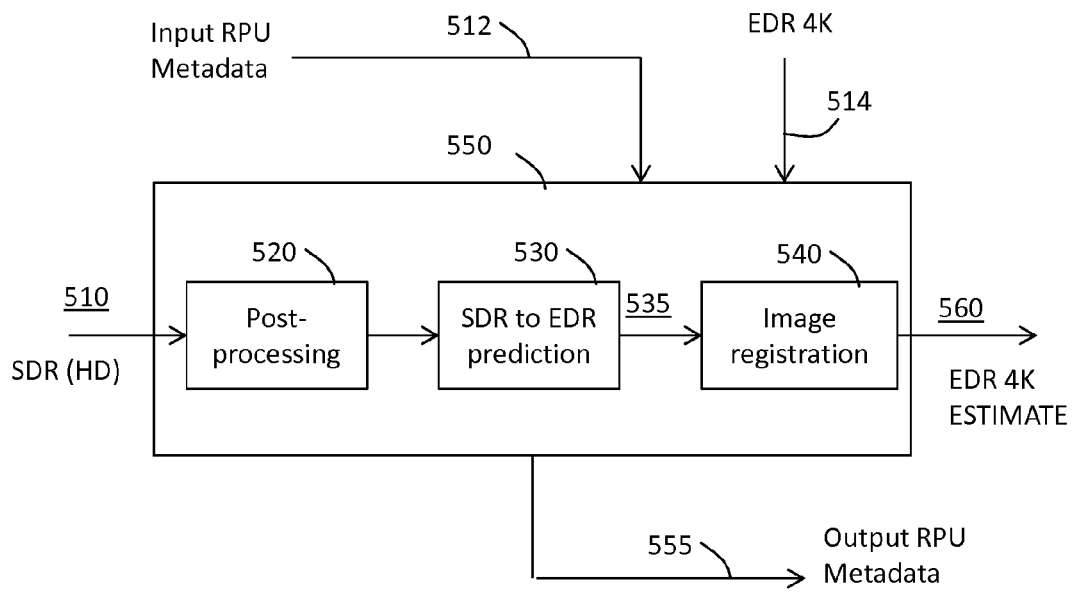
FIG. 5 depicts an example data flow for converting SDR HD video into EDR 4K video, according to an embodiment of the present invention.

FIG. 5 depicts an example dataflow in RPU 320 according to an embodiment. As depicted in FIG. 5, RPU 550 receives an SDR HD picture 510 (e.g., 1920×1080) and optional RPU metadata 512. To improve SDR to EDR prediction 530 and image registration 540, RPU 550 may also receive a copy of the original EDR 4K picture 514. Input RPU metadata 512 may comprise auxiliary data, such as transformation matrices, filtering coefficients, or other parameters, that may assist the RPU processing 550.

Input data 510 may go first through a post-processing stage 520, which typically comprises color transformations (e.g., from YCbCr to RGB) and color up-sampling (e.g., 4:2:0 to 4:2:2). Post-processing 520 may be followed by an SDR to EDR prediction process, which in some embodiments may also be referred to as normalization and mapping. Examples of SDR to EDR prediction are described in PCT Application PCT/US2012/033605, filed on Apr. 13, 2012, and incorporated herein by reference in its entirety.

As used herein, the term "image registration" denotes a series of transformations on image 535 so that the output of the process, image 560, is aligned and matches as close as possible the original EDR 4K image 514. In an example embodiment, image registration may comprise the following steps: a) identifying and removing any horizontal black bars (or other inactive picture areas) in both inputs 535 and 514, b) up-sampling the active picture area of 535 to match the size of the active picture area of input 514, c) cropping or estimating pixel areas so that the active pixel areas are aligned, and d) reinserting black bars as needed to yield the final 4K estimated picture 560. Image registration parameters, such as scaling factors and cropping-related parameters, may also be outputted as output RPU metadata 555 which may be embedded in the RPU layer and transmitted to the decoder, so that the image registration process in the decoder (e.g., 350) matches the image registration process in the encoder (e.g., 300).

In some embodiments, information required for proper image registration 540 may be received as part of the input RPU metadata 512, for example, as part of the 4K to HD transformation process.

Example Joint SDR HD and EDR 4K Signaling with Residual Data

Figure 6A:
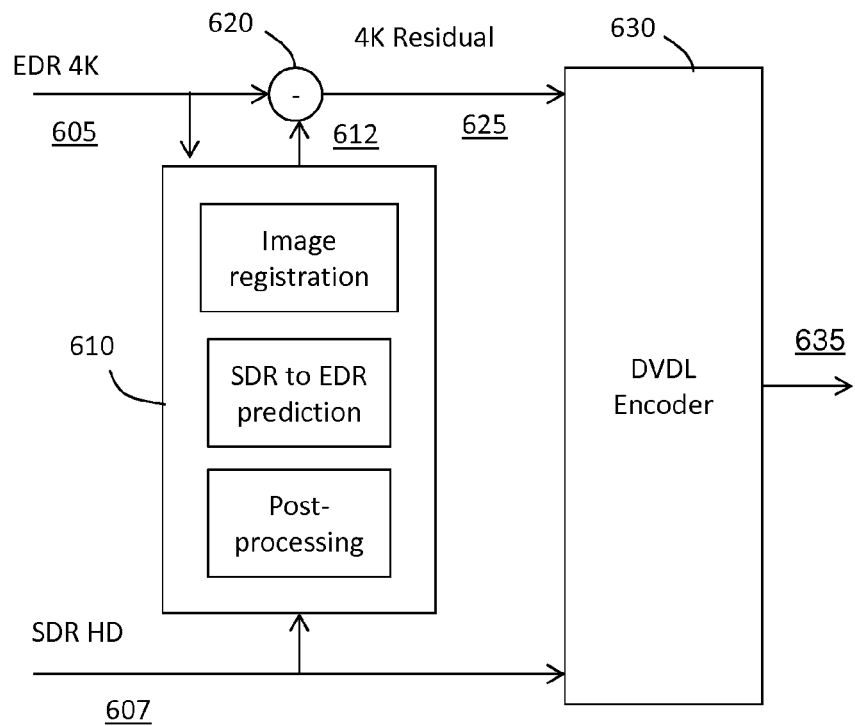
FIG. 6A and FIG. 6B depict an example data flow for encoding, decoding and joint delivery of EDR 4K and SDR HD signals, according to another embodiment of the present invention.
Figure 6B:
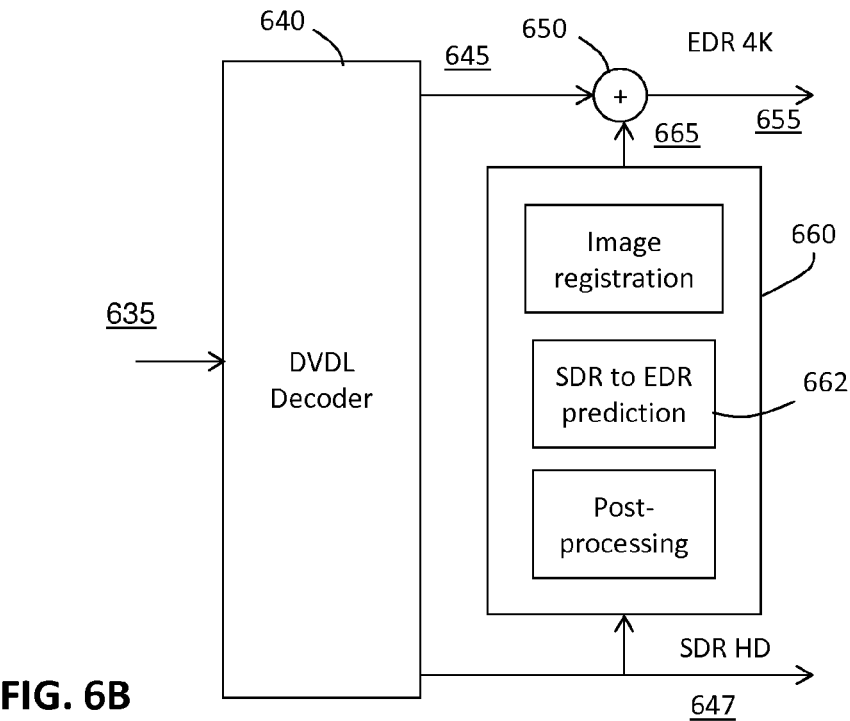

FIG. 6A and FIG. 6B depict another example embodiment for encoding and decoding of a stream that combines a backwards-compatible SDR HD signal and an enhanced EDR 4K signal. As depicted in FIG. 6A, the SDR HD signal 607 is still encoded as the base layer (BL) of a DVDL encoder 630 (e.g., 200); however, instead of coding the EDR 4K signal 605 directly, one may encode a 4K residual 625. The residual 625 signal represents the difference between the original EDR 4K input 605 and its approximation (612) as generated by the processing depicted in unit 610. The residual 4K signal 625 and the processing steps depicted in 610 can be either integrated with the RPU of DVDL encoder 630, or computed separately, as shown in FIG. 6A.

FIG. 6B depicts the decoder corresponding to the encoder depicted in FIG. 6A. On the decoder, legacy decoders can extract the SDR HD signal 647. However, newer decoders may add the decoded 4K residual 645 to an EDR 4K estimate 665 to derive an EDR 4K signal 655 corresponding to the transmitted EDR 4K signal 605. An alternative to using residual-based coding when coding jointly SDR and EDR versions of a signal is to apply an image normalization process, as described next.

Example Image Normalization Process

Figure 11:
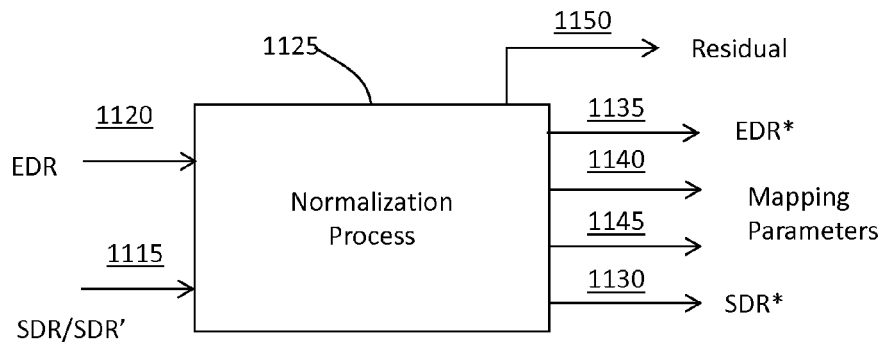
FIG. 11 depicts an example of a normalization process, according to an embodiment of the present invention.

"Dynamic range normalization processing" or simply "normalization" as described in FIG. 11, denotes a process to prepare image or video data for backwards-compatible delivery in video distribution systems, such as video broadcasting or digital cinema. As depicted in FIG. 11, the input to the normalization process 1125 comprises two digital video signals: a standard dynamic range signal 1115 and an EDR signal 1120. In an example embodiment, these signals may be the output of the mastering or color grading process 120; thus, EDR signal 1120 may correspond to EDR signal 125 and SDR signal 1115 may correspond to SDR signal 145. In some embodiments, instead of operating on the SDR signal 1115, normalization process 1125 may operate on an SDR' signal, which represents the same scene as the SDR signal but at a higher accuracy. For example, typical SDR today comprises 8-bit (per color component), 4:2:0, ITU Rec. 709 data. SDR' typically has the same color space (primaries and white point) as SDR, but uses high precision with all color components at full spatial resolution (i.e., 16-b, 4:4:4 or 4:2:0 RGB).

Normalization process 1125 produces a first normalized digital signal 1130 (e.g., SDR*) and a second normalized digital signal 1135 (e.g., EDR*), where the second normalized digital cinema signal 1135 is visually identical to the input EDR signal 1120. The normalization process 1125 allows the first normalized digital signal 1130 and the second normalized digital signal 1135 to be related by invertible mapping. In other words, once normalized, digital signal 1130 can be obtained from digital signal 1135 through forward mapping, while digital signal 1135 can be obtained from digital signal 1130 through an inverse mapping. Assuming, for example, that the first signal 1130 is indicated by SDR* (where * is to indicate a normalized version of input 1115) and the second signal 1135 is indicated by EDR* (which is usually equal to the EDR input 1120 to numerical precision), the following relationship holds true: SDR*=(MoN) EDR*, where MoN is the forward mapping operator mentioned above. The preprocessor 1125 also produces inverse and/or forward mapping parameters 1140 and/or 1145 to be sent, e.g., as metadata. Such parameters allow obtaining signal 1135 from signal 1130 through inverse mapping or signal 1130 from signal 1135 through forward mapping. The mapping parameters obtained and the mapping performed are such that inverse mapping the SDR* signal will exactly reproduce the EDR signal. For example, EDR* may be derived as EDR*=(MoN)$^{-1}$ SDR*. Example embodiments of deriving normalization mapping parameters as described herein are described in U.S. Provisional Application 61/576,141, filed on Dec. 15, 2011, "Backwards-compatible delivery of digital cinema content with extended range and related preprocessing and coding methods", also filed as PCT Application No. PCT/US2012/068275, filed on Dec. 6, 2012, incorporated herein by reference in its entirety.

In some embodiments, the normalization process may yield an EDR* output signal that differs significantly from the original EDR input. In such cases, an additional residual 1150 signal (e.g., EDR-EDR*) may be formed. Such a residual may be encoded and transmitted as an auxiliary bit-stream layer, for example, using means similar to the ones depicted in the example embodiment of FIG. 6A. On a decoder, as depicted in FIG. 6B, after an inverse normalization process (e.g., SDR to EDR prediction 662), the decoded residual (e.g., 645) may be added to the predicted EDR* signal to yield the final EDR estimate.

Example 3D EDR and 3D SDR Signaling

Figure 7A:
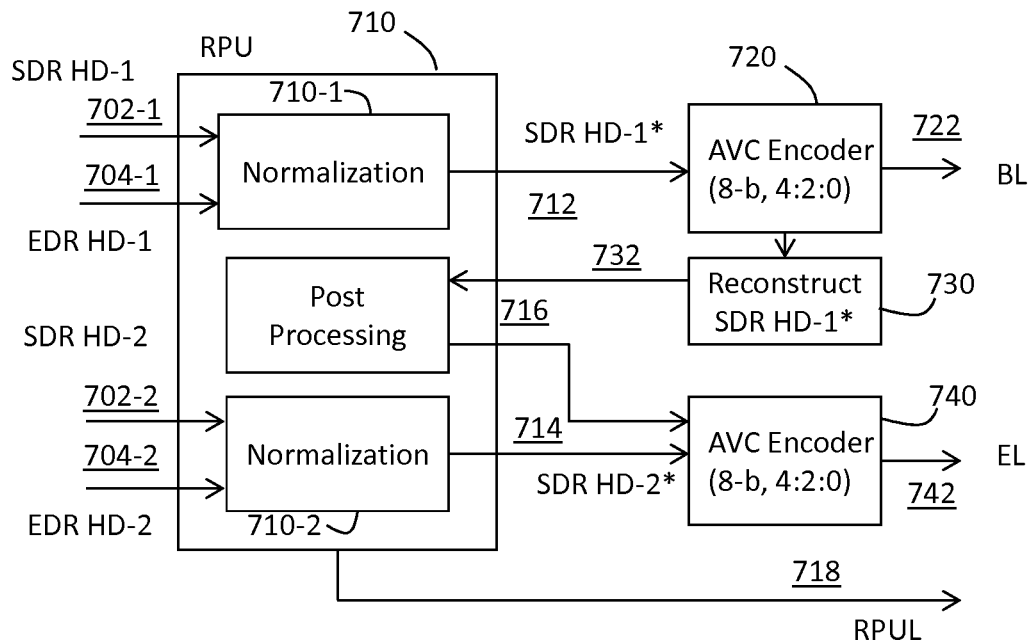
FIG. 7A and FIG. 7B depict an example data flow for encoding, decoding and joint delivery of 3D SDR HD and 3D EDR HD signals, according to another embodiment of the present invention.
Figure 7B:
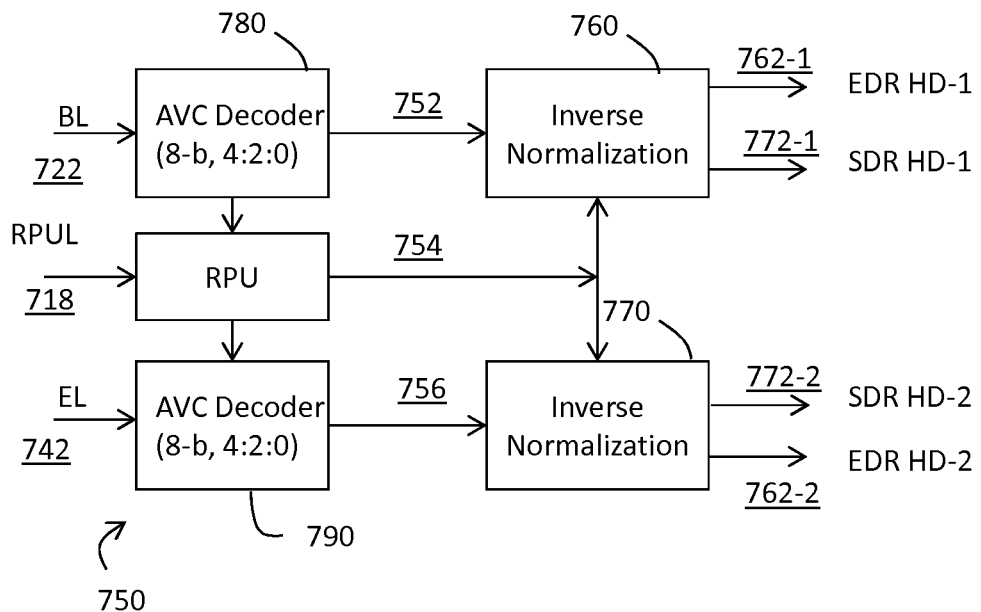

FIG. 7A depicts an example framework for the joint encoding and transmission of a bitstream that combines according to an embodiment a 3D SDR HD stream and a 3D EDR HD stream. Given such a bit-stream, FIG. 7B depicts the corresponding decoder which allows decoding a backwards compatible 2D SDR HD stream, a 3D SDR HD stream, a 2D EDR HD stream, or a 3D EDR HD stream. Similarly to the DVDL encoder 200 and DVDL decoder 250 depicted in FIG. 2A and FIG. 2B, embodiments depicted in FIGS. 7-10 may use storage units, such as BL store 215 and EL store 225, for storing intermediate data being used by the RPU and the BL and EL codecs; however, for simplicity, not all such storage may be shown in these figures.

As depicted in FIG. 7A, the RPU 710 processing of the DVDL encoder comprises two normalization steps and a post-processing step. 3D SDR HD signal 702 comprises two views: SDR HD-1 702-1 and SDR HD-2 702-2. 3D EDR HD signal 704 comprises also two views: EDR HD-1 704-1 and EDR HD-2 704-2. Given these pairs of SDR and EDR inputs, as described earlier, each of the two normalization steps in the RPU 710 (710-1 and 710-2) will compute a corresponding normalized SDR* signal (SDR HD-**1\* 712 and SDR HD-2\* 714). SDR HD-1\* 712 signal may be encoded using a standard AVC encoder 720 to generated a coded BL signal 722. Signal 732 represents a reconstructed version of the SDR HD-1\* 712 signal and after some post-processing in RPU 710, it may be used as an source of reference frames during the encoding of the SDR HD-2\* 714 signal in video encoder 740. Information related to the RPU normalization and post-processing steps may be encoded as metadata into the RPUL stream 718. Streams BL 722, EL 742, and RPUL 718** may be combined and transmitted as a single stream.

As depicted in FIG. 7B, a compatible decoder 750 may use a first AVC decoder 780 to decode the received coded BL 722 to extract a decoded normalized SDR-HD-1\* signal 752. Inverse normalization 760 may generate either SDR HD-1 signal 772-1 or EDR HD-1 signal 762-1. After decoding the coded EL layer 742 with a second AVC decoder 790, using inverse normalization 770, decoder 750 may recreate another view of either the 3D EDR HD signal (762-2) or the 3D SDR HD signal (772-2), or both.

3D EDR HD and 2D SDR HD Signaling

Figure 8A:
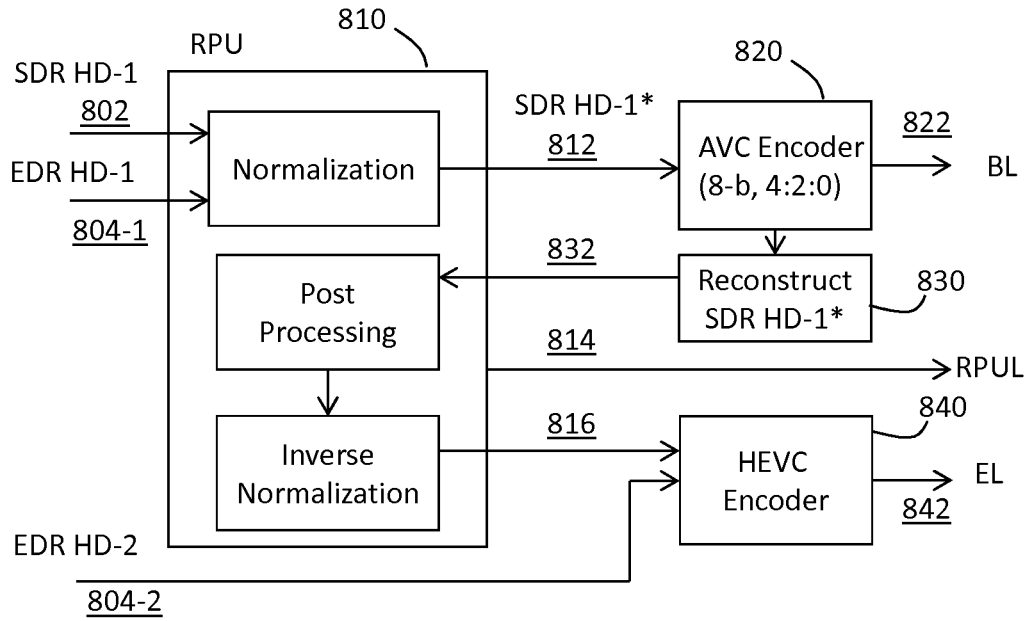
FIG. 8A and FIG. 8B depict an example data flow for encoding, decoding, and joint delivery of 3D EDR HD and 2D SDR HD signals, according to an embodiment of the present invention.

FIG. 8A depicts an example framework for the joint encoding and transmission of a bit-stream that combines according to an embodiment a 3D EDR HD stream and a 2D SDR HD stream. Given such a bit-stream, FIG. 8B depicts the corresponding decoder which allows decoding a backwards compatible 2D SDR HD stream, a 3D EDR HD stream, or a 2D EDR HD stream.

As depicted in FIG. 8A, the RPU 810 of the DVDL encoder comprises a normalization step, a post-processing step, and an inverse normalization step. Given 3D EDR HD signal 804 (EDR HD-1 804-1 and EDR HD-2 804-2) and a 2D SDR HD signal (SDR HD-1 802), as described earlier, the normalization step will compute an SDR HD-**1\* 812 signal. SDR-HD-1\* is compressed (coded) using AVC encoder 820 to output a coded BL signal 822. Signal 832 represents a reconstructed version of the SDR HD-1\* 812 signal. After a post-processing step and an inverse normalization step, RPU output 816 represents an approximation of the EDR HD-1 signal (804-1) as it will be received in a decoder. HEVC Encoder 840 generates an EL stream 842 by jointly coding input EDR HD-2 804-2 and RPU output 816. Signals BL 822, EL 842, and RPUL 814** may be combined and transmitted as a single stream.

Figure 8B:
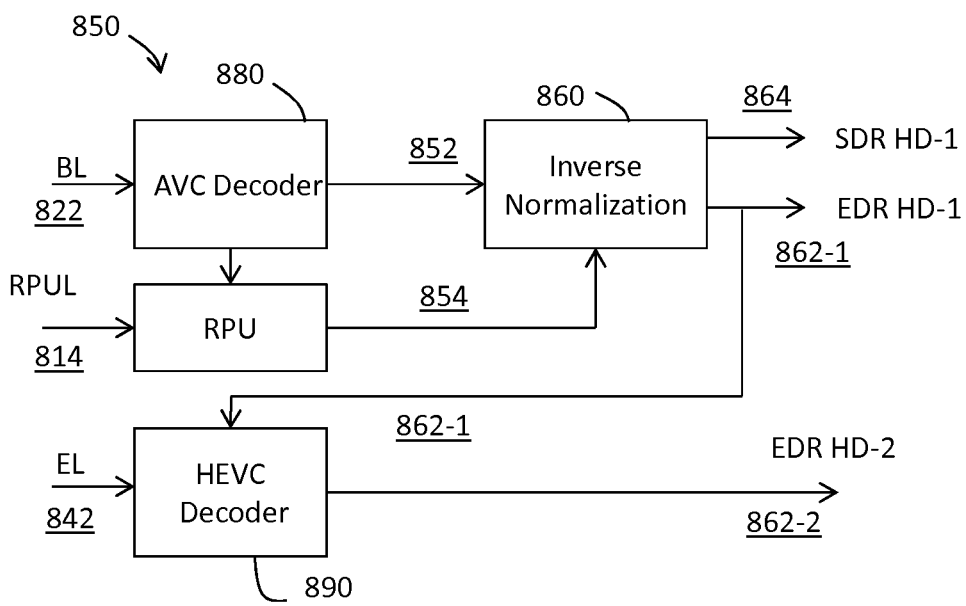

As depicted in FIG. 8B, a compatible decoder 850 may use an AVC decoder 880 to decode the received coded BL 822 stream to extract a decoded SDR-HD-1\* signal 852 which can be used to derive either the SDR HD-1 signal 864 or EDR HD-1 signal 862-1 using inverse normalization 860. A second bit-stream decoder (e.g., HEVC decoder 890) may apply decoded EDR HD-1 862-1 frames to decode the EL input stream 842 and generate the second EDR HD view, signal EDR HD-2 862-2.

3D EDR 4K and 2D SDR HD Signaling

Figure 9A:
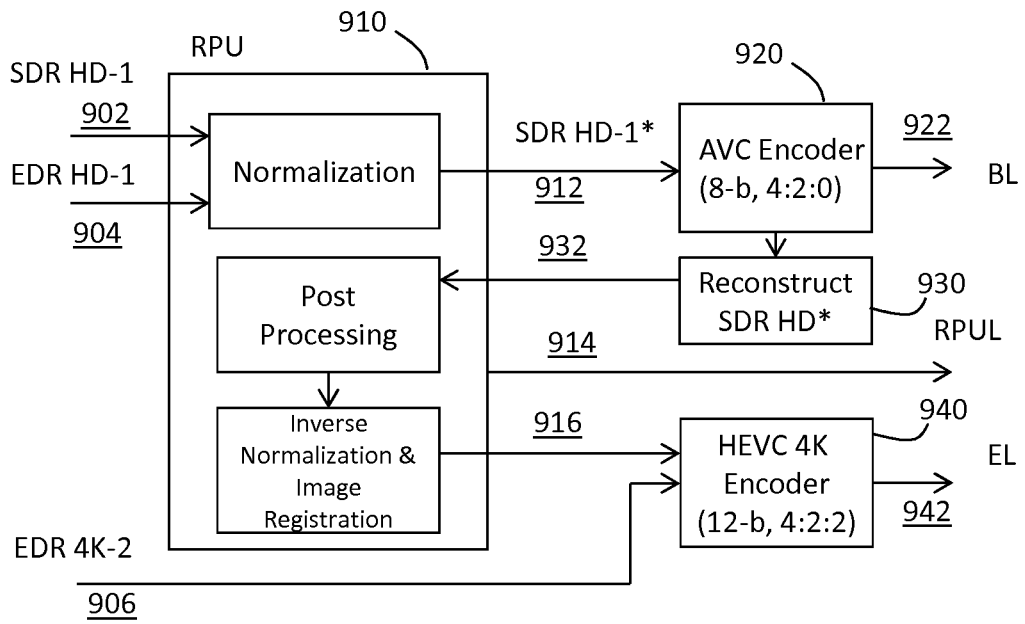
FIG. 9A and FIG. 9B depict an example data flow for encoding, decoding, and joint delivery of 3D EDR 4K and 2D SDR HD signals, according to an embodiment of the present invention.
Figure 9B:
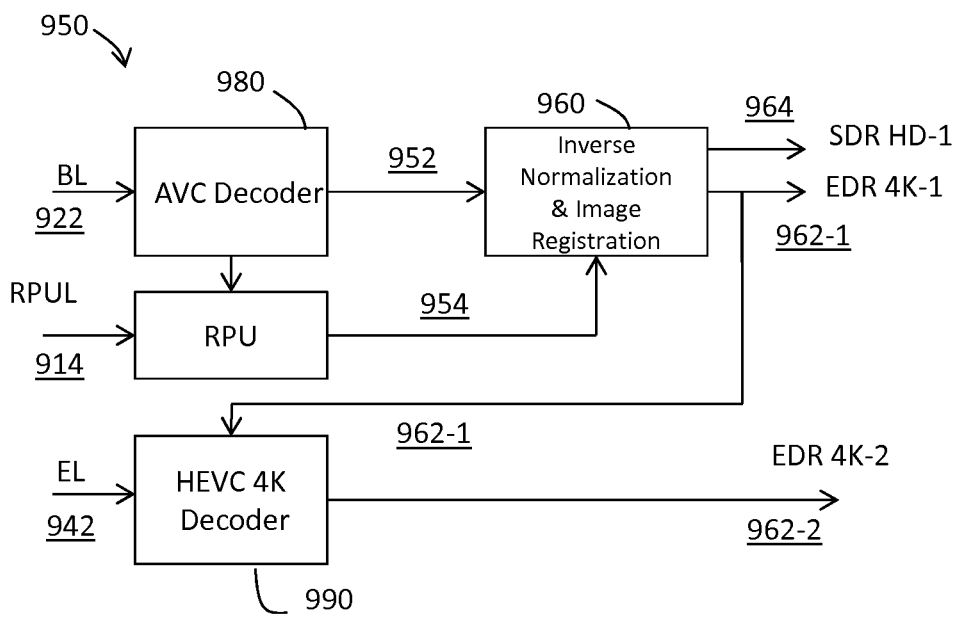

The methods depicted in FIG. 8A and FIG. 8B may also be extended to support signaling EDR enhanced resolution signals (e.g., 4K signals) as depicted in FIG. 9A and FIG. 9B. FIG. 9A depicts an example framework for the joint encoding and transmission of a bit-stream that combines according to an embodiment a 3D EDR 4K stream and a 2D SDR HD stream. Given such a bit-stream, FIG. 9B depicts the corresponding decoder which allows decoding a backwards compatible 2D SDR HD stream, a 3D EDR HD stream, or a 2D EDR HD stream.

As depicted in FIG. 9A, the RPU 910 of the DVDL encoder comprises a normalization step, a post-processing step, an inverse normalization step, and an image registration step. The process assumes that given a captured 3D EDR 4K signal (e.g., 115), a mastering process can generate the following signals: one view (EDR 4K-2 signal 906) of the 3D EDR 4K signal, an EDR HD-1 904 signal (e.g., a down-sampled version of EDR 4K-1), and an SDR HD-1 902 signal (e.g., an SDR version of the EDR HD-1 view). As described earlier, the normalization process between the SDR-HD-1 and the EDR HD-1 signals will compute a normalized SDR HD-**1\* 912 signal, which may be compressed (encoded) using AVC encoder 920 to output coded BL signal 922. Signal 932 represents a reconstructed version of the SDR HD-1\* 912 signal. After a post-processing step, an inverse normalization step, and an image registration step, RPU output 916 represents an approximation of the original EDR 4K-1 signal (not shown) as it will be reproduced in a decoder. HEVC 4K Encoder 940 generates an EL stream 942 by jointly coding input EDR 4K-2 906 and RPU output 916. Signals BL 922, EL 942, and RPUL 914** may be combined and transmitted as a single stream.

In this example embodiment, an image registration step is added because of the mismatch in signal resolutions after the inverse normalization step (which corresponds to the SDR to EDR step 530 depicted in FIG. 5). SDR HD-1\* has an HD resolution while the estimate of EDR 4K-1, RPU output 916, has a 4K resolution. As explained earlier, in such a scenario, image registration may be applied to correct for mismatches in scaling and cropping that occurred when creating EDR HD-1 904 from its corresponding EDR 4K-1 signal.

As depicted in FIG. 9B, a compatible decoder 950 may use an AVC decoder 980 to decode the received coded BL 922 stream to extract a decoded SDR-HD-1* signal 952, which can be used to derive SDR HD-1 signal 964 using inverse normalization 960. Optionally, following optional image registration, it can also derive a first view of the EDR 4K signal, signal EDR 4K-1 962-1. A second decoder (e.g., HEVC decoder 990) may utilize the EDR 4K-1 output signal to decode the EL stream 942 to generate the second EDR 4K view, signal EDR 4K-2 962-2.

3D SDR HD and EDR 4K Signaling

Figure 10A:
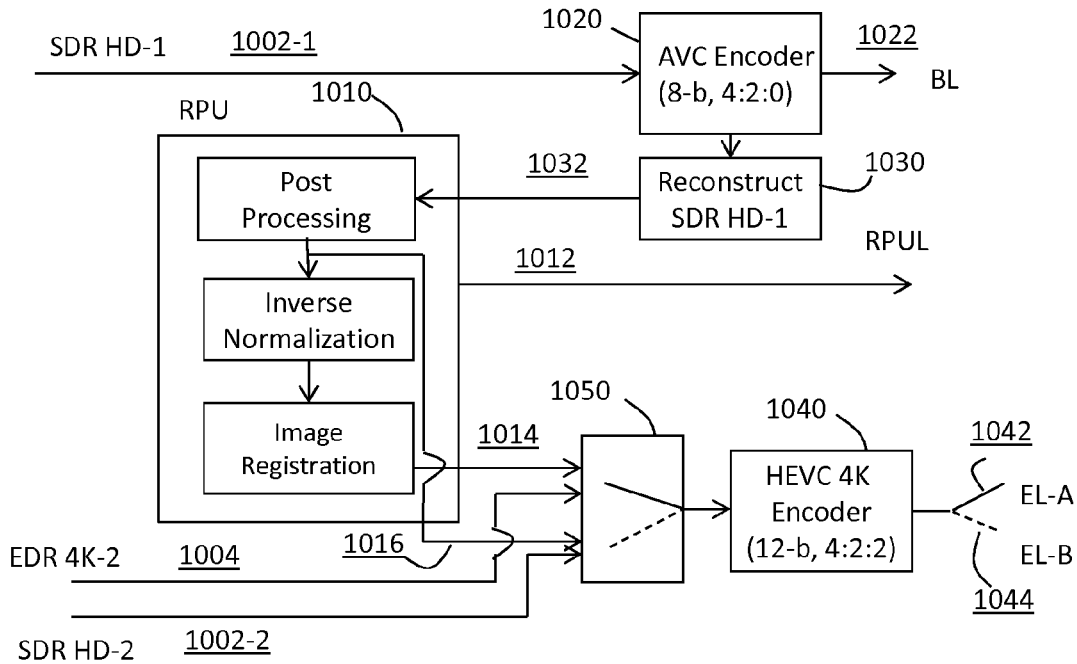
FIG. 10A and FIG. 10B depict an example data flow for encoding, decoding, and joint delivery 3D SDR HD, 2D SDR HD, and 2D EDR 4K signals, according to an embodiment of the present invention.

FIG. 10A depicts an example framework for the joint encoding and transmission of a bit-stream that combines according to an embodiment a 3D SDR HD stream and a 2D EDR 4K stream. Given such a bit-stream, FIG. 9B depicts the corresponding decoder which allows decoding a backwards compatible 2D SDR HD stream, a 3D SDR HD stream, or a 2D EDR 4K stream.

As depicted in FIG. 10A, one view of the 3D SDR HD stream 1002 (SDR HD-1 1002-1) is coded directly as the BL 1022 stream using an encoder 1020. The reconstructed SDR HD-1 signal 1032 can be post-processed by the RPU 1010 to generate signal 1016, an estimate of the SDR-HD-1 signal 1002-1. RPU 1010 may also generate signal 1014 based on signal 1016 and an inverse normalization step. Signal 1014 is an estimate of the EDR 4K-1 view (not shown) used to create (e.g., via normalization) SDR-HD-1 1002-1. Given these inputs, HEVC 4K encoder 1040 may generate two possible coded EL streams (1042 and 1044). For example, EL-A 1042 comprises a coded bit-stream based on EDR 4K-2 1004 and signal 1014, an estimate of the EDR 4K-1 signal. Bit-stream EL-B 1044 comprises a coded bit-stream based on SDR HD-2 1002-2 and signal 1016, an estimate of the SDR HD-1. In an alternative embodiment, instead of switching between the two sets of inputs (1014/1004 or 1016/1006) using a single encoder 1040, an encoder could use two separate encoders, one encoder for generating the EL-A stream and one encoder to generate the EL-B stream. The encoder depicted in FIG. 10A may multiplex and transmit coded signals BL 1022, RPUL 1012, EL-A 1042, and EL-B 1044 using a single bit-stream to be received by an example decoder, as depicted in FIG. 10B.

Figure 10B:
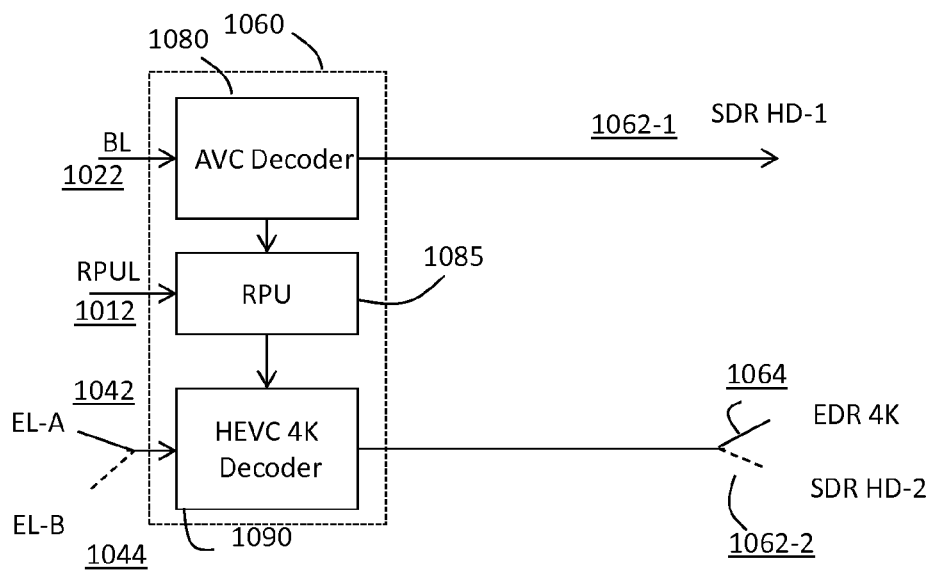

As depicted in FIG. 10B, a compatible DVDL decoder 1060 includes a first decoder (e.g., AVC decoder 1080), an RPU 1085, and a second decoder (e.g., HEVC decoder 1090). The operations in the decoder RPU 1085 may match all the processing steps shown in the encoder RPU 1010, such as: post-processing, inverse normalization, and image registration.

After demultiplexing the coded BL, EL-A, and EL-B signals in the received bit stream, the first decoder 1080 can decode the BL 1022 stream to generate a backwards compatible SDR HD-1 1062-1 signal. Similarly, the second decoder 1090, through the RPU 1010, may utilize all available inputs and frames from output SDR HD-1 to decode either an EDR 4K bit-stream 1064 or a second view of the SDR HD signal 1062 (e.g., SDR HD-2 1062-2).

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to multi-layer video delivery, such as those described herein. The computer and/or IC may compute any of a variety of parameters or values that relate to multi-layer video delivery as described herein. The image and video dynamic range extension embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement multi-layer video delivery methods as described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to multi-layer video delivery for EDR and enhanced video resolution formats are thus described. In the foregoing specification, embodiments of the present invention have been described with reference to numerous specific details that may vary from implementation to implementation. Thus, the sole and exclusive indicator of what is the invention, and is intended by the applicants to be the invention, is the set as recited in Claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:
1. A method comprising:
   accessing a standard dynamic range (SDR) video signal (902), a first view of a first 3D enhanced dynamic range (EDR) video signal (904), and a second view of a second 3D EDR video signal (906), wherein the second view of the second 3D EDR video signal has a higher resolution than the first view of the first 3D EDR video signal;

applying a normalization process to the SDR video signal and the first view of the first EDR video signal to generate a normalized SDR* signal (912);

encoding the normalized SDR* signal with an encoder (920) to generate a coded base layer (BL) stream (922);

applying an inverse normalization process and an image registration process to a signal based on the normalized SDR* signal to generate an estimate EDR video signal with the same resolution as the second view of the second 3D EDR video signal; and encoding using a dual-view-dual-layer (DVDL) encoder the estimate EDR video signal and the second view of the second EDR video signal to generate a coded enhancement layer (EL) stream (942).

2. The method of claim 1, wherein the SDR signal has a high definition (HD) resolution, the first view of the first EDR signal has an HD resolution, and the second view of the second EDR signal has a 4K resolution.

3. A method comprising:

accessing a coded BL stream (922) and a coded EL stream (942);

decoding the coded BL stream with a first video decoder (980) to generate a first normalized (SDR*) video stream (952);

applying an inverse normalization process (960) and an image registration process to the first normalized video stream to generate an SDR output video stream (964) and a first view of an EDR output video stream (962-1), wherein the first view of the EDR output video stream has higher resolution than the resolution of the SDR output video stream;

decoding with a second video decoder (990) the coded EL stream (942) to generate a second view of the EDR video stream, wherein the decoding by the second video decoder is based on both the coded BL stream and the first view of the EDR stream.

4. The method of claim 3 wherein the SDR output video has an HD resolution and the EDR output video has a 4K resolution.

5. The method of claim 3 wherein the first video decoder is an AVC decoder and the second video decoder is an HEVC decoder.

6. A method comprising:

accessing a 3D SDR video stream comprising a first view (1002-1) and a second view (1002-2);

accessing one view of a 3D EDR video stream (1004), where the 3D EDR video stream has a higher resolution than the 3D SDR stream;

encoding with a first encoder (1022) the first view of the 3D SDR video stream to generate a coded BL stream (1022);

decoding (1030) the coded BL stream to generate a decoded BL video stream (1032);

generating a reconstructed SDR stream (1016) based on the decoded BL video stream;

applying an inverse normalization process and an image registration process to the reconstructed SDR stream to generate a second EDR signal (1014);

using a second video encoder, generating a first coded EL stream (1042) based on the one view of the 3D EDR video stream (1004) and the second EDR signal (1014); and using the second video encoder, generating a second coded EL stream (1044) based on the second view of the 3D SDR video stream (1002-2) and the reconstructed SDR stream (1016).

7. The method of claim 6 wherein the first encoder is an AVC encoder and the second encoder is an HEVC encoder.

8. The method of claim 6 wherein the 3D SDR video stream has an HD resolution and the 3D EDR video stream has a 4K resolution.

9. The method of claim 6 wherein the 3D SDR stream and 3D EDR stream represent the same scene but at a different dynamic range.

10. A method comprising:

receiving a coded BL stream (1022), a first coded EL stream (1042), and a second coded EL stream (1044) encoded according to the method of claim 6;

decoding the coded BL stream using a first decoder (1080) to generate a first view of an SDR stream (1062-1);

using a reference processing unit (RPU) and a second decoder, generating a second view of the SDR stream (1062-2) based on the second coded EL stream and an RPU output; and using the RPU and the second video decoder, generating an EDR video stream (1064) based on the first coded EL stream and the RPU output, wherein the EDR video stream has a higher resolution than the SDR stream.

* * * * *